B. F. CLARK.
MEAT-HOOKS.

No. 177,471. Patented May 16, 1876.

Witnesses
Saml J. Van Stavoren
Jos. P. Connelly

Inventor
Benjamin F. Clark
By Connelly Bros., Attorneys

UNITED STATES PATENT OFFICE.

BENJAMIN F. CLARK, OF PHILADELPHIA, PENNSYLVANIA, ASSIGNOR OF ONE-HALF HIS RIGHT TO GEORGE J. WECKERLY, OF SAME PLACE.

IMPROVEMENT IN MEAT-HOOKS.

Specification forming part of Letters Patent No. 177,471, dated May 16, 1876; application filed February 24, 1876.

*To all whom it may concern:*

Be it known that I, BENJAMIN F. CLARK, of Philadelphia, in the county of Philadelphia and State of Pennsylvania, have invented certain new and useful Improvements in Meat-Hooks; and do hereby declare the following to be a full, clear, and exact description of the invention, such as will enable others skilled in the art to which it pertains to make and use it, reference being had to the accompanying drawings, which form part of this specification, in which—

Figure 1:
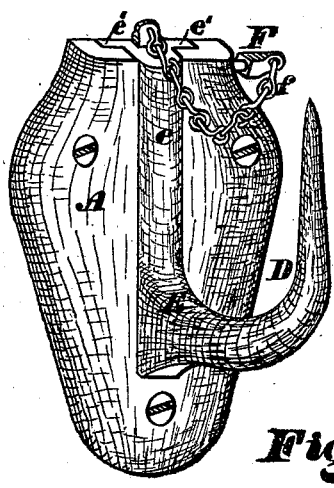
Figure 2:
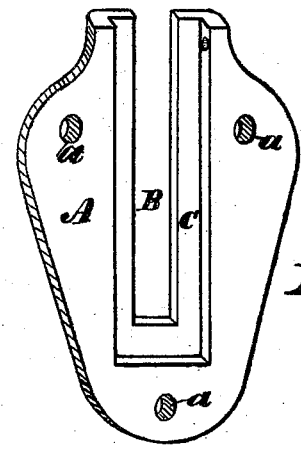

Figure 1 is a perspective view of my invention. Fig. 2 is a perspective view of the bracket.

My invention has for its object to provide a meat-hook which can be readily detached from the bar or wall for cleaning purposes, or when meat hung upon it becomes fast frozen in position.

In the accompanying drawing, A indicates a bracket, designed to be fastened to the bars or walls of a stall, shop, or house by means of screws or nails passing through openings *a a*. Said bracket is formed with a vertical slot, B, which leads to a groove, C, on the back side of the bracket. D represents the curved and pointed part of the hook, springing from a base, E, the central portion of which, *e*, projects through the slot B, while the flanges *e'* *e'*, or side extensions, rest in the corners of the groove C. The hooked portion is inserted in the bracket by merely sliding the base E down in the slot B and groove C, and is removed by a reverse action. F is a pin, secured, by a chain, *f*, to the base E, and passing through an opening in said base and in the bracket A. The object of this pin is to prevent the hook from becoming accidentally displaced when lifting sections of meat from it.

Heretofore, in cleaning meat-hooks, which are liable to become very foul and dirty, great danger had to be incurred, as such hooks are generally hung immovably at considerable height, and in positions difficult of approach. So, too, in cold weather meat is liable to freeze on the hooks, so that when the latter are not detachable it is difficult, if not impossible, to take it down. Further, it will sometimes be found that the regular position of a hook will be found inconvenient, as where there are two hooks on a post, and an unusually large quarter of beef, for instance, is hung upon the upper hook, the lower one will "jab" the meat. My improvements overcome all these difficulties. For cleaning purposes, as well as where the meat is frozen or where any inconvenience arises, the hook may be readily removed, and all danger and trouble avoided.

What I claim as my invention is—

1. As a new article of manufacture, the improved meat-hook, consisting of the grooved and slotted bracket A and the removable hook-base and hook E, said hook projecting outwardly and upwardly from the base, and tapering to a point, for special adaptation to meat-stalls, as shown and described.

2. The combination of bracket A, having slot B and groove C, hook D, springing from base E, and retaining-pin F, fastened by chain *f*, substantially as shown and described.

In testimony that I claim the foregoing I have hereunto set my hand this 16th day of February, 1876.

BENJAMIN F. CLARK.

Witnesses:
GEO. C. SHELMERDINE,
M. DANL. CONNOLLY.